(12) United States Patent
Cira et al.

(10) Patent No.: US 7,514,646 B2
(45) Date of Patent: Apr. 7, 2009

(54) METHODS AND APPARATUS FOR WIRELESS DISPLAY UNITS FOR DOCUMENT TRAYS IN FINANCIAL DOCUMENT PROCESSING

(75) Inventors: John J. Cira, Waterloo (CA); Wayne M. Doran, Kitchener (CA); Susan H. Schott, Waterloo (CA)

(73) Assignee: NCR Corporation, Dayton, OH (US)

(*) Notice: Subject to any disclaimer, the term of this patent is extended or adjusted under 35 U.S.C. 154(b) by 24 days.

(21) Appl. No.: 09/848,004

(22) Filed: May 3, 2001

(65) Prior Publication Data

US 2002/0165871 A1 Nov. 7, 2002

(51) Int. Cl.
*B07C 5/00* (2006.01)
*G06K 9/00* (2006.01)
(52) U.S. Cl. ............... 209/583; 235/379; 382/137; 705/45; 271/298; 270/52.02
(58) Field of Classification Search ............. 209/583, 209/584, 587, 900, 534, 656, 657; 235/379; 271/3.01, 3.14; 382/137–140
See application file for complete search history.

(56) References Cited

U.S. PATENT DOCUMENTS

| | | | | |
|---|---|---|---|---|
| 5,225,978 A | * | 7/1993 | Petersen et al. | 705/33 |
| 5,469,170 A | * | 11/1995 | Mariani | 342/51 |
| 5,470,427 A | | 11/1995 | Mikel et al. | |
| 5,505,473 A | * | 4/1996 | Radcliffe | 280/79.2 |
| 5,598,169 A | * | 1/1997 | Drabeck et al. | 343/701 |
| 5,619,416 A | * | 4/1997 | Kosarew | 700/225 |
| 5,627,517 A | * | 5/1997 | Theimer et al. | 340/572.1 |
| 5,751,581 A | * | 5/1998 | Tau et al. | 700/115 |
| 5,768,140 A | * | 6/1998 | Swartz et al. | 700/225 |
| 5,850,187 A | * | 12/1998 | Carrender et al. | 340/10.6 |
| 5,859,726 A | * | 1/1999 | Copenhaver et al. | 359/350 |

(Continued)

FOREIGN PATENT DOCUMENTS

EP 0 376 739 7/1990

(Continued)

*Primary Examiner*—Jeffrey A Shapiro
(74) *Attorney, Agent, or Firm*—Priest & Goldstein PLLC; Michael Chan

(57) ABSTRACT

Techniques for use of wireless labels to provide information relating to documents in a document processing operation are described. A plurality of document processing trays each have affixed a label for receiving and displaying messages which are received wirelessly from a central communication interface. The messages provide information relating to documents to be placed within or contained within the trays. When a group of documents undergoes initial processing, the group of documents is sorted into a plurality of sorting locations. Each of the sorting locations has an associated tray and label and the documents within the sorting location are placed within the tray. Messages relating to the documents within each tray are transmitted and displayed on the label affixed to the tray. The messages provide information such as the large group, such as an entry, and sorting location to which the documents belong and the endpoint of the documents. The message may also provide information relating to the processing priority of the documents. As processing continues, new messages are transmitted appropriate to the processing stage of the documents. If documents are sorted into new sorting locations, new associations between the trays and the sorting locations are established and the documents are placed in and associated with trays and labels associated with the new sorting locations.

12 Claims, 11 Drawing Sheets

U.S. PATENT DOCUMENTS

| | | | |
|---|---|---|---|
| 5,869,820 A * | 2/1999 | Chen et al. | 235/376 |
| 6,105,004 A * | 8/2000 | Halperin et al. | 705/28 |
| 6,135,697 A * | 10/2000 | Isaacs et al. | 414/281 |
| 6,156,988 A * | 12/2000 | Baker | 209/584 |
| 6,199,044 B1 * | 3/2001 | Ackley et al. | 704/275 |
| 6,224,048 B1 * | 5/2001 | Motamed | 270/52.02 |
| 6,363,687 B1 * | 4/2002 | Luciano et al. | 53/55 |
| 6,370,446 B1 * | 4/2002 | Divine | 700/226 |
| 6,522,945 B2 * | 2/2003 | Sleep et al. | 700/225 |
| 6,568,675 B1 * | 5/2003 | Boss | 271/292 |
| 6,610,954 B2 * | 8/2003 | Takizawa | 209/583 |
| 6,650,225 B2 * | 11/2003 | Bastian et al. | 340/5.92 |
| 6,710,891 B1 * | 3/2004 | Vraa et al. | 358/1.12 |
| 6,788,426 B1 * | 9/2004 | Yamanaka et al. | 358/1.15 |
| 2002/0087231 A1 * | 7/2002 | Lewis et al. | 700/230 |

FOREIGN PATENT DOCUMENTS

| | | |
|---|---|---|
| EP | 0 495 661 | 7/1992 |
| EP | 0 595 596 | 5/1994 |

\* cited by examiner

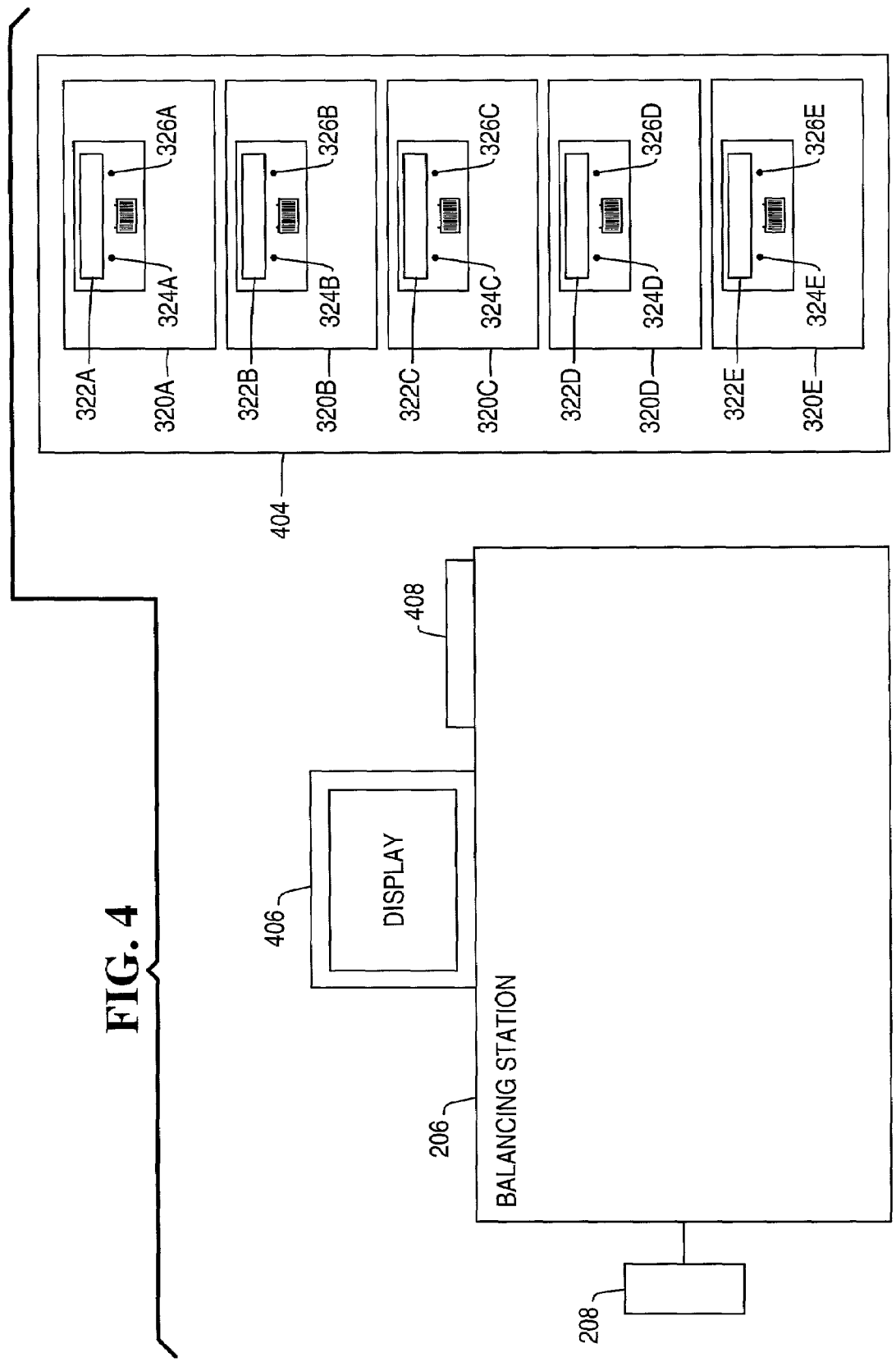

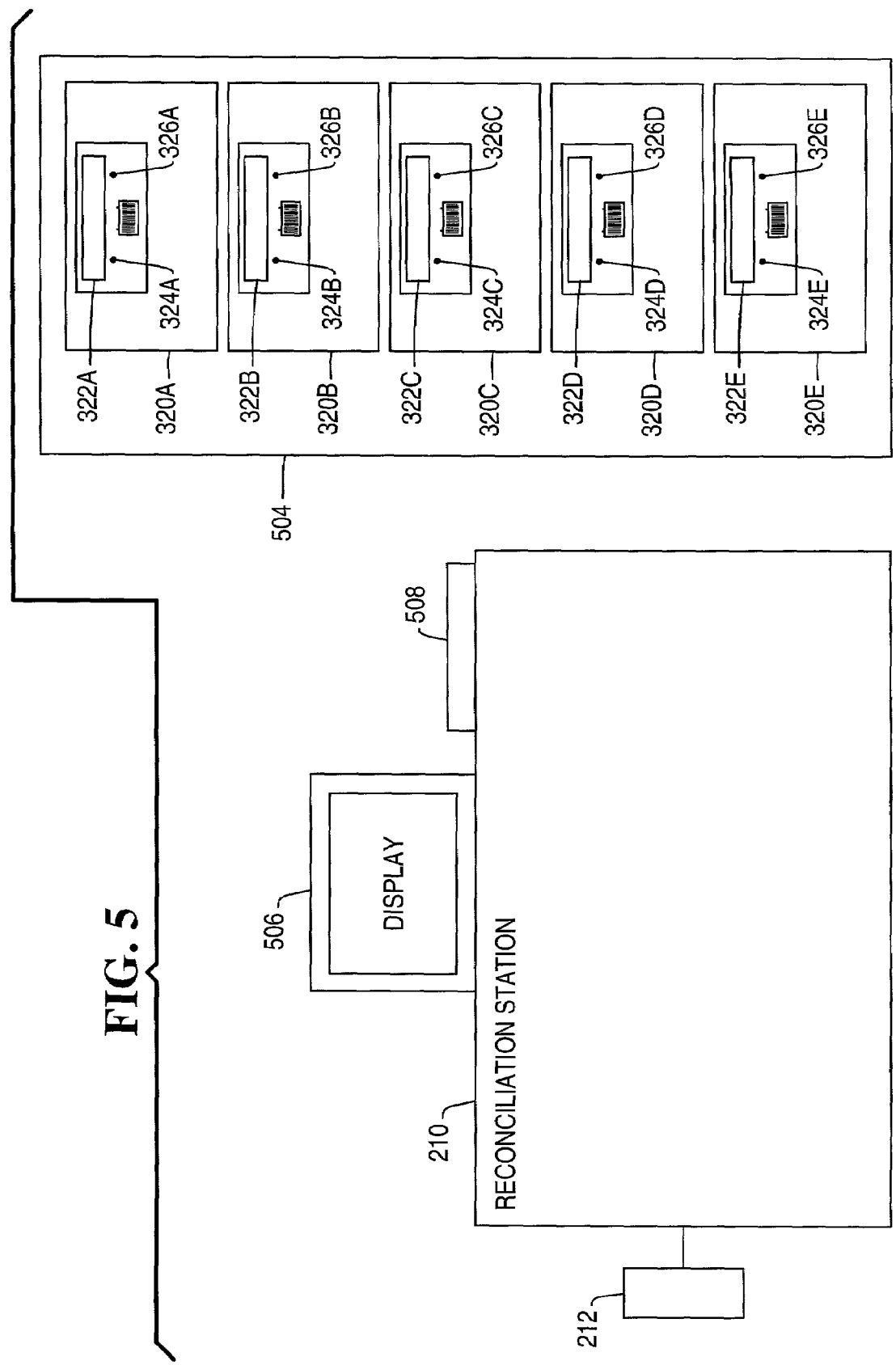

METHODS AND APPARATUS FOR WIRELESS DISPLAY UNITS FOR DOCUMENT TRAYS IN FINANCIAL DOCUMENT PROCESSING

The related applications entitled "Methods and Apparatus for Wireless Operator Notification in Document Processing Systems" and "Methods and Apparatus for Wireless Operator Remote Control in Document Processing Systems", filed on even date herewith and assigned to the assignee of the present invention, address related subject matter and are incorporated herein by reference in their entirety.

FIELD OF THE INVENTION

The present invention relates generally to improvements in financial document processing. More particularly, the invention relates advantageous methods and apparatus for using wireless electronic labels with document trays in order to provide information related to the identification and handling of documents within or to be placed in the trays.

BACKGROUND OF THE INVENTION

Processing of financial documents, such as bank deposits and the items making up the deposits, includes a number of stages, with machine processing stages being followed by stages of transporting documents from one location to another, as well as human intervention in machine processing stages. Human intervention may be required, for example, to locate sets of documents showing discrepancies during machine processing. For example a deposit comprising a deposit slip and documents making up the deposit may show a discrepancy between a deposit total as reflected on the deposit slip and the actual total of the deposited items. Human intervention is then typically necessary to locate the documents, determine the reason for the discrepancy and make adjustments needed to correct the discrepancy. Each time a human operator performs an operation in a document processing operation, the operator must be furnished with necessary information, such as where to take the documents, where to find an item which needs to be examined, which items have a higher priority for processing, and the like.

In typical deposit processing systems, deposits are grouped into batches of approximately 250 items each. Work is organized by entries, where an entry is a large number of documents processed and reconciled as a unit. During processing, an entry is divided into a number of smaller units. Each of the smaller units comprises a more convenient quantity of documents for sorting, temporary storage and research and document location by a human operator.

During interim processing stages, each of the smaller units is stored in a document tray. An entry typically comprises approximately 10,000 items, and each of the smaller units stored in a document tray consists of approximately 2,000 items. Each batch comprises groups of related documents representing a single transaction, for example a deposit which consists of a deposit slip and the documents, such as checks, making up the deposit.

A deposit processing system includes one or more item transports, each of which performs various operations on items and sorts the items into pockets. As items arrive in pockets, they are placed into trays. Each tray typically holds items from a single entry and a single pocket, and is identified by a number.

In order to receive information about where to look for an item or to receive instructions about what to do with a tray, an operator using a prior art document processing system typically needs to go to a display to receive the information, and then look for a tray which is identified by tray number Typically, a tray is identified by a number written on a label affixed to the tray. The number may represent an entry number, pocket number or tray number, for example. When an operator places the contents of a pocket in a tray, he or she refers to data presented on a display in order to determine what number or numbers should be written on the tray label in order to associate the tray with the pocket and with the entry to which the pocket contents belong. It is possible for the operator to enter the tray number incorrectly, or for the tray number to fall off, leading to a failure to properly identify a tray containing a desired item or a tray which is to be moved to another processing stage. In addition, the need to walk to a console to obtain information about which tray contains a needed item or where a tray should be taken next interferes with operator productivity by forcing operators to walk back and forth between consoles and work areas in order to obtain information and then act on it. Furthermore, trays are routinely moved to holding areas while other operations occur which on completion require the movement of trays to new locations. It is not always clearly known when the operations will be finished and a tray will need to be moved to the next location. The providing of operator information through a console will result in a loss of efficiency because the operator will have to check the console periodically during the time a tray is being held, until the tray is ready to be moved. An operator's time will be wasted by having to check repeatedly to determine whether a tray should be moved, or alternatively a tray will be held beyond the time that processing is able to begin.

Moreover, it is extremely inconvenient to determine which trays should be assigned priority in handling if the information is obtained by walking over to a console to check on the priority of a tray. This is because priorities are preferably set according to the total dollar amounts of the items contained in a tray, the association of a tray with an entry having a high priority or other factors associated with the contents of the tray. Because the contents of a tray, and the relative status of the tray with respect to other trays, is subject to change, it is difficult to predict when a tray will assume a high priority warranting special handling. In order to determine without undue delay when the contents of a tray achieve a high priority, it would be necessary to repeatedly go to a console to check the priority of the various trays. This would interfere with work, as operators repeatedly checked the console to determine if a particular tray had achieved a special priority.

There exists, therefore, a need for a system which will allow a reliable association between a tray and documents within the tray, which will allow an operator to receive needed information relating to a document tray without a need to go to a central location to receive the information, which will allow immediate operator notification when a particular tray is to be moved to a new processing location, and which will allow immediate notification of changes in priority of the documents associated with and contained in a tray.

SUMMARY OF THE INVENTION

A document processing system according to the present invention includes a plurality of electronic labels, each electronic label being affixed to a document tray. Each of the electronic labels preferably receives information wirelessly through a centralized communication interface. Each of the electronic labels preferably has a unique address to permit use of electronic labels within radio range of one another without interference. The communication interface is controlled by a central communication server, which is in turn connected to a subserver controlling the processing system. Multiple processing systems may operate in parallel, with each processing system using its subserver to communicate with the communication server, allowing multiple processing systems to share a communication interface. The subserver is connected to a plurality of station controllers, each of the station controllers directing the operation of a station belonging to the document processing system. Stations may include item transports, balancing stations, reconciliation stations and the like. The central communication server, the subservers and the station controllers are preferably connected by a local area network. The subserver or subservers that monitor and control the system workflow determine when an electronic label on a tray being handled at or expected by the station needs to display a different message. The subserver passes the information to the communication server, which formats a message for transmission and sends it to the appropriate electronic label.

At the beginning of processing an entry, an entry number is created. This is preferably done by reading a field in a magnetic ink character recognition (MICR) codeline of a tray header document. A tray header document is preferably sent to each pocket before any documents to be processed arrive in the pocket. Pocket numbers are also created for each pocket of the item transport where initial processing of the entry occurs, for example, the image capture stage for the typical deposit processing operation. At initiation of processing, an association is made between each tray and a corresponding pocket. Each electronic label preferably bears a bar code which is associated with the label. The labels and their associated bar codes are stored in a database in the subserver. In order to associate a tray and a pocket, a tray header document bearing a bar code is preferably sent to each pocket before any documents to be processed arrive in the pocket. For each pocket, the bar code on the tray header document is read with a bar code scanner, which may preferably be a handheld bar code scanner. Next, a bar code on the electronic label affixed to a tray is read using the bar code scanner. The bar code information is stored in the subserver, establishing a reliable association between each pocket and a corresponding tray. Documents which are sorted to a pocket are then associated with the tray corresponding to the pocket. As the documents within the tray go through various processing stages, the subserver tracks their status and prepares appropriate messages for transmission to the electronic label corresponding to the tray, sending the messages to the communication server, which manages and controls their transmission using the communication interface. The electronic label is preferably adapted from an electronic shelf label, which provides an inexpensive addressable display adapted to receive wireless information and to operate within range of many different electronic labels, all receiving and displaying different information without interfering with one another.

An alternative method of associating a tray and a pocket is for the operator to scan the bar code which is printed on the electronic label affixed to a particular tray. The bar code is uniquely associated with the radio frequency (RF) identification number or address of the electronic label. The device used to scan the bar code (preferably a handheld bar code scanner) transmits the bar code data to a central location and the operator is prompted through the item transport display to enter the corresponding pocket number for the tray. This procedure uniquely associates a specific pocket with a corresponding tray and an electronic label associated with the tray.

It will be recognized that numerous other additional methods may be employed to associate pockets with labels and their associated trays.

It is possible to operate multiple document processing systems in parallel, with each processing system sending messages to labels being used by the system. Because the labels are addressable, labels belonging to different systems can be used within radio range of one another, and transmissions for a label being used by one system will not be displayed by or otherwise interfere with a label being used by another system.

A more complete understanding of the present invention, as well as further features and advantages of the invention, will be apparent from the following Detailed Description and the accompanying drawings.

BRIEF DESCRIPTION OF THE DRAWINGS

FIG. 4 illustrates a balancing station according to the present invention;

FIG. 5 illustrates a reconciliation station according to the present invention;

DETAILED DESCRIPTION

Figure 1:
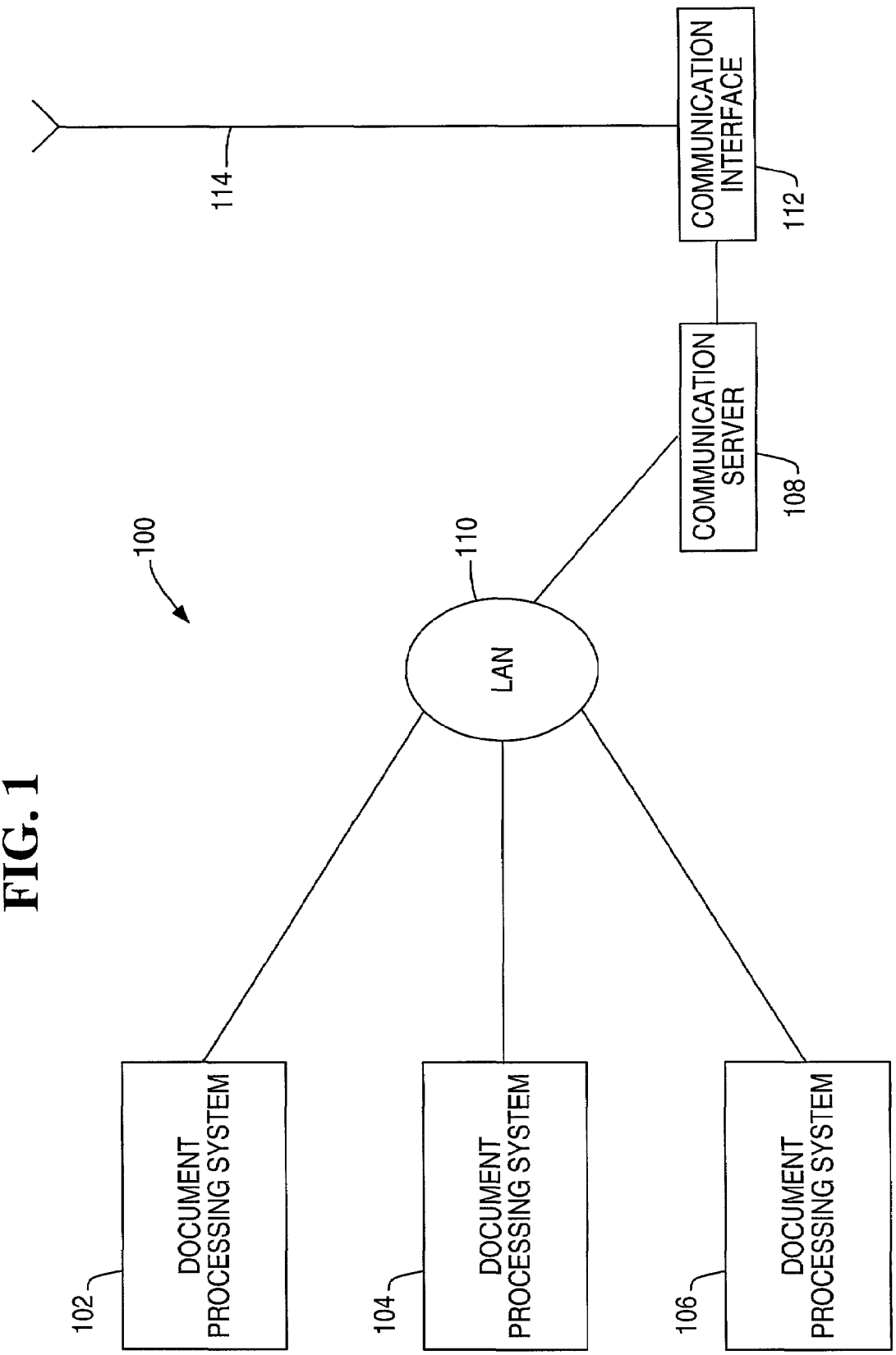
FIG. 1 illustrates a document processing center according to the present invention.

FIG. 1 illustrates a document processing center 100 according to the present invention. The system 100 includes document processing systems 102, 104 and 106 operating independently and in parallel, all communicating with a central communication server 108 through a local area network 110. The document processing center 100 also includes a communication interface 112 for relaying wireless messages between the communication server 108 and various wireless devices employed in the operation of each of the document processing systems 102, 104 and 106. The communication interface 112 transmits and receives wireless messages using an antenna 114, preferably located within the ceiling of a room in which the document processing center 100 is located. For the sake of simplicity, only the system 102 will be described in detail here, but the systems 104 and 106 may suitably be similar and employ similar or identical equipment. Alternatively, the systems 104 and 106 may employ different equipment from that of the system 102 and of one another, so long as they are able to communicate with the communication server 108.

Figure 2:
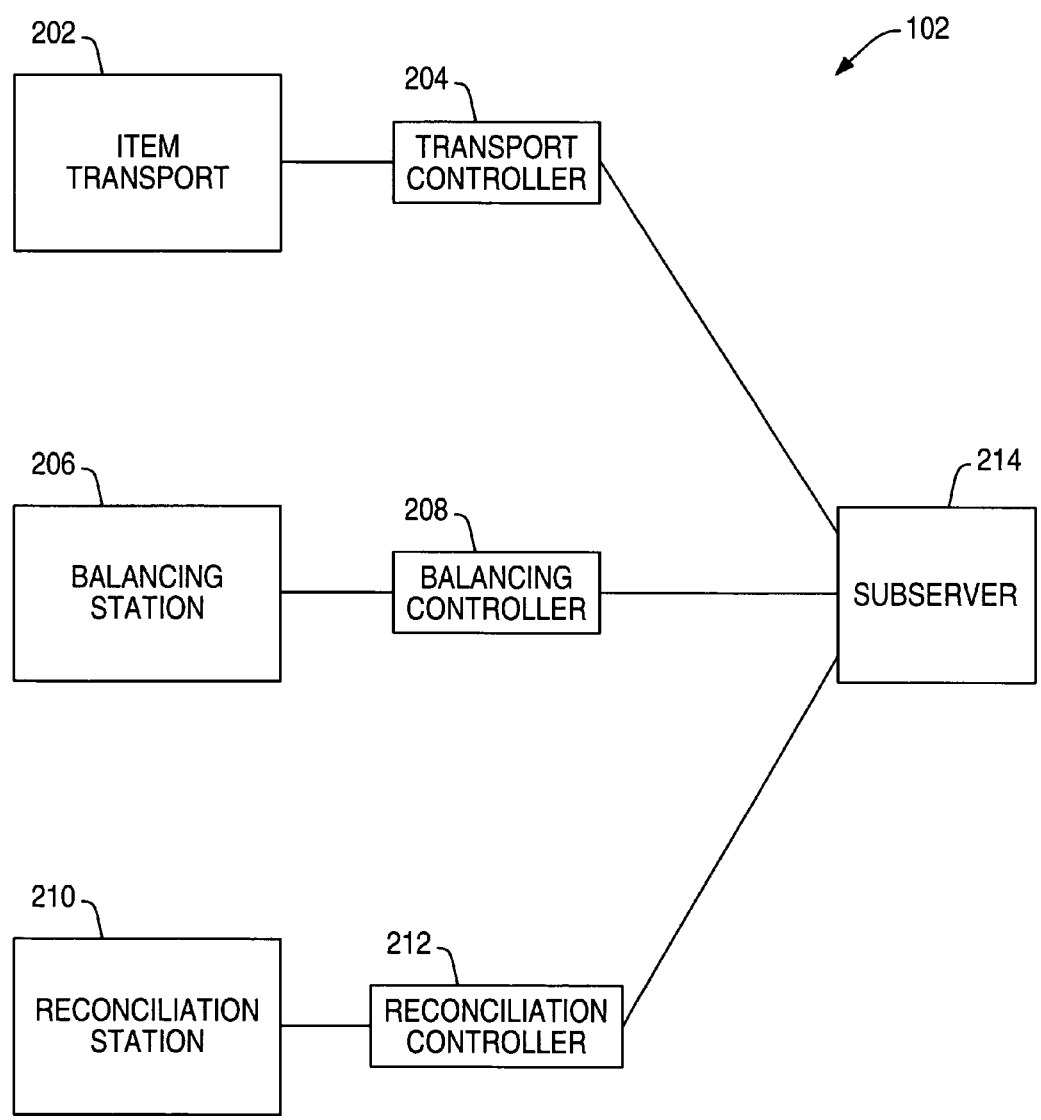
FIG. 2 illustrates a document processing system according to the present invention.

FIG. 2 illustrates the document processing system 102 in greater detail. The document processing system 102 performs a number of different processing stages carried out by different processing stations. The processing stations include an item transport 202, controlled by a transport controller 204, a balancing station 206 controlled by a balancing station controller 208 and a reconciliation station 210, controlled by a reconciliation station controller 212. Each of the controllers 204, 208 and 212 communicates with a subserver 214, which manages information relating to the processing operation and prepares messages for the transmitter server 108.

Figure 3A:
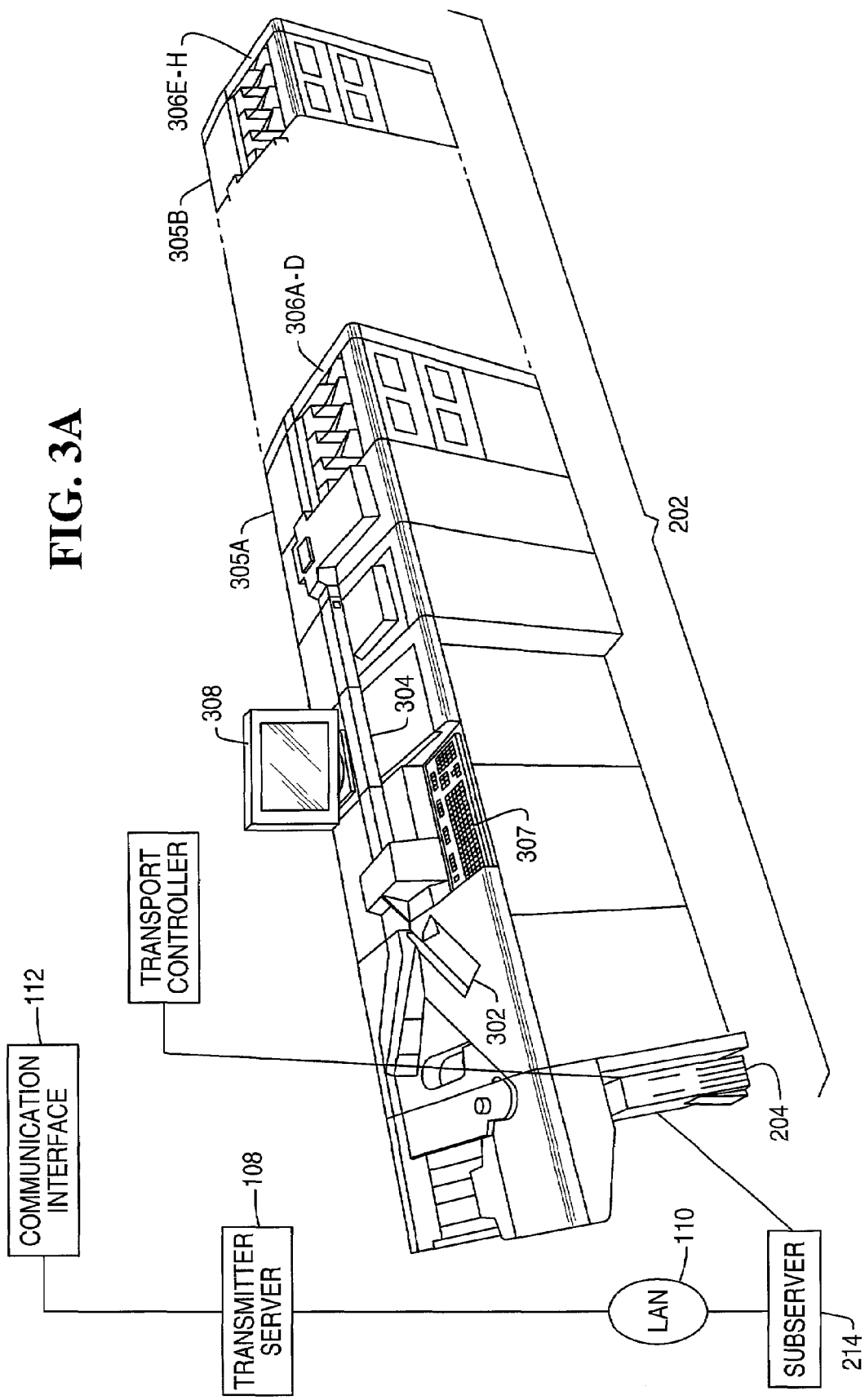
FIG. 3A illustrates an item transport according to the present invention.

FIG. 3A illustrates one embodiment of the item transport 202 in additional detail. The item transport 202 comprises a hopper 302, a feeder (not visible here) a transport path 304 and sorting pocket modules 305A and 305B. The sorting pocket module 305A includes sorting pockets 306A-306D and the sorting pocket module 305B includes sorting pockets 306E-306H. The sorting pocket modules 306A and 306B are physically distinct units of machinery, each containing four pockets, but in document processing operations the pockets 306A-306H are grouped according to the needs of the processing operation being performed. For example, a particular operation may use the pockets 306A-306D as a set of pockets for grouping of documents, while another operation at a later stage of processing may use the set of pockets 306A-306B, while still another operation uses the pockets 306A-306H. It will be recognized that the number of sorting pocket modules which may be used is not limited to the two represented by the modules 305A and 305B. Instead, the transport 202 may include as many sorting pocket modules as are needed.

The transport 202 is controlled by the transport controller 204 which may suitably be a programmed personal computer (PC) which controls the operation of the transport 202 and which receives inputs from an operator through a keyboard 307 and displays operator messages through a monitor 308. The transport controller 204 communicates with the subserver 214. The subserver 214 communicates with the communication server through the LAN 110. The communication server 214 controls the communication interface 112 and uses the communication interface 112 to transmit messages received from the subserver 214 to electronic labels affixed to document trays. As documents are processed using the transport 202, the documents are placed in the document trays and messages relating to status and further processing of the documents are transmitted to electronic labels affixed to the trays. Additional details of the trays and the electronic labels and transmission of the messages to the labels are discussed below.

Figure 3B:
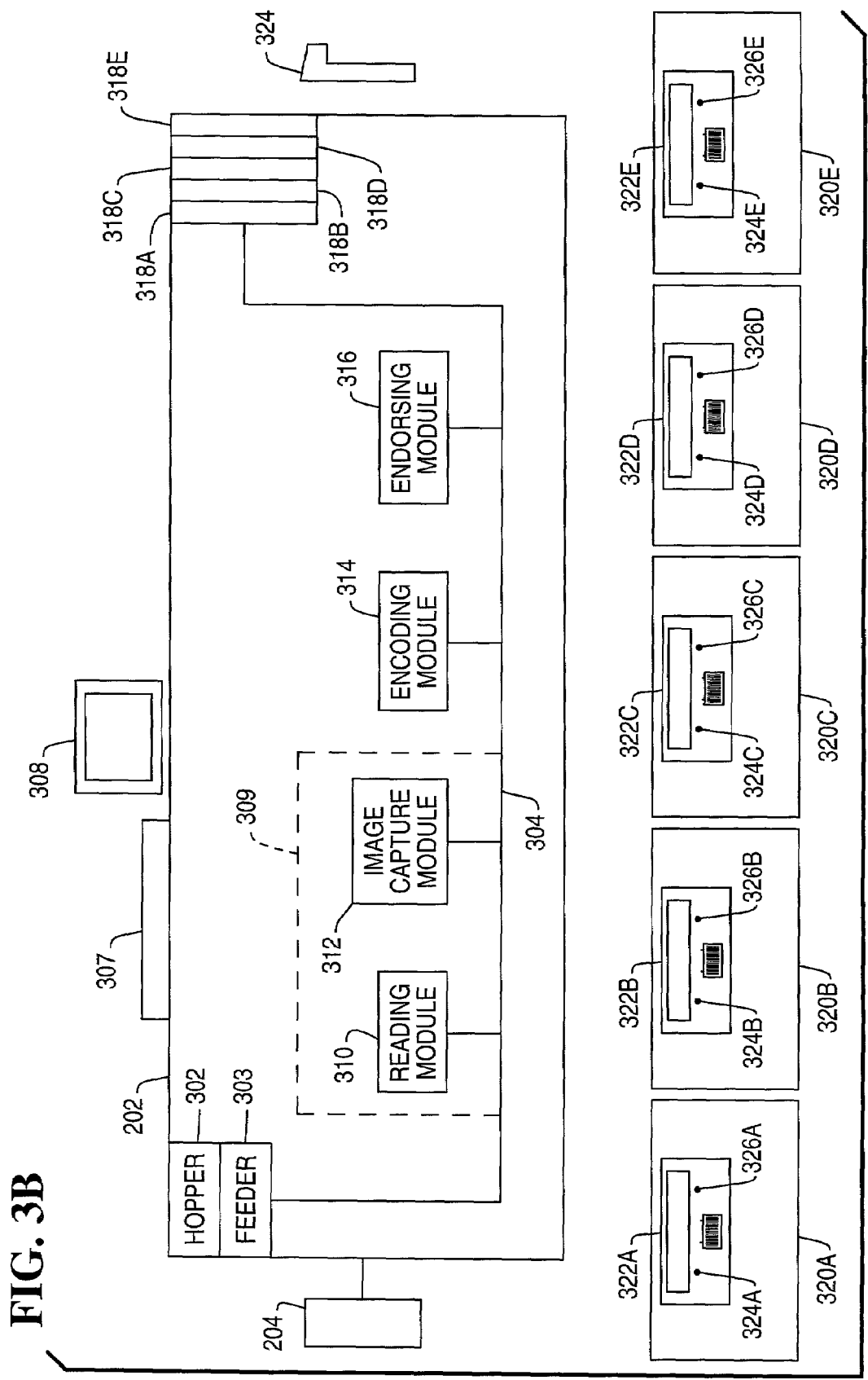
FIG. 3B illustrates functional details of an item transport according to the present invention.

FIG. 3B is a functional view of the item transport 202, serving to illustrate functional details of the transport 202. The item transport 202 includes the document hopper 302, a document feeder 303, the transport path 304, the keyboard 307 and the monitor 308, as well as an item capture module 309 which includes a reading module 310 and an image capture module 312. The item transport 202 also includes an encoding module 314 and an endorsing module 316, as well as a number of sorting pockets 318A-318E. Documents are typically processed in multiple passes through the item transport 202, and not all of the different modules perform processing during each pass. Document processing by the item transport 202 typically comprises an initial stage of item capture and a subsequent stage of encoding, endorsing and sorting.

The transport controller 204 directs sorting of documents into one of the pockets 318A-318E at the end of each processing pass. In order to prepare the transport controller 202 for operation on a group of documents, the transport controller 204 associates each pocket with the group of documents being processed and assigns an identifying number to each of the pockets 318A-318F. For example, the term "entry" is commonly used to refer to an organizational unit of documents. An entry typically comprises approximately 10,000 items. An item is a set of documents such as a deposit, comprising a deposit slip listing the individual documents making up the deposit, together with the checks, "cash in" tickets or other items making up the deposit. For example, a deposit may consist of a deposit slip listing $50 in cash, a check for $102.30 and a check for $397.30, for a total deposit of $449.60. The deposit would also include a "cash in" ticket for $50 and the checks for $102.30 and $397.30 which were listed on the deposit slip. Each of the pockets 318A-318E receives items sorted into the pockets according to sorting criteria determined by the needs of the processing stage being performed.

In preparation for processing, each pocket is assigned an entry number and a pocket number. This is preferably done either by keying of the entry number by an operator or by passing an entry header document through the item transport 202 and sorting a pocket header document into each of the pockets 318A-318E before processing any documents. The pockets 318A-318E may, for example, be assigned the numbers Entry 1, pocket 1; Entry 1, pocket 2; Entry 1, pocket 3; Entry 1, pocket 4; and Entry 1, pocket 5, respectively. After the entry numbers and pocket numbers have been assigned to the pockets 318A-318E, each of the pockets is associated with a document tray 320A-320E to be used to hold documents during interim processing stages and at the end of processing. Each of the document trays 320A-320E has affixed an electronic label 322A-320E, respectively. The labels 322A-322E wirelessly receive information describing documents in or to be placed in the trays and display that information to operators. The labels 322A-322E also receive and display instructions for moving a tray from one processing stage to another and also receive and display information relating to processing priority of tray contents. Each of the pocket header documents preferably contains a bar code which can be scanned by a bar code scanner 324. The bar code scanner 324 is preferably a wireless scanner which transmits bar code information to the communication interface 112 of FIG. 1. The communication interface 112 passes the bar code information to the communication server 108, which in turn passes the information to the subserver 214 of FIG. 2 where it is accessible for use by the transport controller 204. Each of the labels 322A-322E preferably includes a bar code, and an association between each of the pockets 318A-318E and a corresponding one of the trays 320A-320E can be established by scanning the header document sorted into the pocket and then scanning the bar code on the electronic label affixed to the tray. For example, when a header document arrives in the pocket 318A, the operator can scan the bar code on the header document using the scanner 324 and then scan the bar code on the label 322A. The bar code information from the header document and from the label is transmitted to the communication interface 112 and from there to the communication server 108 and subserver 214. The header document in each of the other pockets 318B-318E is scanned, along with its corresponding label 322B-322E, respectively. An association is thus established between each pocket and the corresponding label. An alternative way of establishing the association between a pocket and a tray is for the operator to scan one of the labels 322A-322E and then enter a pocket number for the pocket with which the tray is to be associated, preferably using the keyboard 307. Scanning and the corresponding key entry is preferably performed for each pocket and label for which it is desired to establish an association, and may suitably be directed by prompts to the operator displayed using the monitor 308, instructing the operator when to scan a label and when to make an appropriate key entry.

The subserver 214 maintains a database associating each pocket with a corresponding label, based on the scans of the header documents and the corresponding labels. The transport controller 204 maintains a record of which documents are sorted into which pockets. It is therefore possible to associate a particular document with a label and therefore with the tray to which the label is affixed.

Once the pocket numbers are assigned and the association between trays and pockets has been made, the transport controller 204 submits the pocket number for each of the pockets 318A-318E to the subserver 214. Pocket numbers are typically assigned based on the type of work to be done on the pocket contents, typically through parameters in the application used to process the pocket contents. The subserver 214 sends the entry number and the pocket numbers to the transmitter server 108, which prepares and directs transmission of a message for each of the electronic labels 322A-322E, assigning the entry number and a pocket number to each electronic label and thus to an electronic label's corresponding tray. The transmitter server 108 preferably contains a database including an address of each electronic label, so that it is easy to associate a pocket belonging to a particular transport with an electronic label by associating the pocket with an appropriate electronic label address. Each electronic label has a unique RF identifier or address corresponding to the bar code appearing on the electronic label. Each bar code appearing on a label is preferably unique to the label on which it appears.

Once the pockets 318A-318E are associated with the corresponding labels 322A-322E and an appropriate message has been displayed on each of the labels 322A-322E, processing of documents can begin on the documents comprising the entry.

The documents are placed in the hopper 302, for item capture processing. They are passed to the feeder 303, which feeds them into the transport path 304. The transport path 304 carries the documents to the item capture module 309, the encoding module 314 and the endorsing module 316 and then carries each document to an appropriate one of the sorting pockets 318A-318E. At this point, the encoding module 314 and the endorsing module 316 do not perform processing on the documents. The item capture module 309 captures information about each document for storage. As each document is processed by the item capture module 309, the reading stage 310 captures and stores encoded information appearing on the document. The image capture stage 312 captures and stores a visual image of the document. The encoded information and the visual image for each document is stored by the transport controller 204.

After item capture is performed on each document, the document is sorted to a corresponding one of the pockets 318A-318E. Once a pocket is filled with documents, the documents are placed in the tray corresponding to the pocket. Each of the pockets 318A-318E is preferably labeled with the appropriate pocket number, which is matched by the number displayed by each of the corresponding electronic labels. In order to further insure that documents are placed in the correct tray, it is possible to precede batches of documents with a bar coded header document designating the correct pocket. When a batch of documents is removed from a pocket, for example the pocket 318A, the header document can be scanned. Then, the electronic label affixed to the tray, such as the electronic label 322A affixed to the tray 320A, is scanned before the documents are placed in the tray. If the documents are being placed in the correct tray, the entry number and pocket number is displayed. If the documents are being placed in an incorrect tray, an error message is displayed, showing the operator the correct tray into which the documents are to be placed.

Once a tray is filled, it is taken to an item capture staging area while processing continues. Each of the trays 320A-320E preferably displays the entry number and pocket number of the items within the tray, as well as the endpoint of the items within the tray, displayed using the electronic labels 322A-322E. The electronic labels may suitably be designed to display information in sequential screens, with each of the labels 322A-322E having a first pushbutton 324A-324E, respectively, to allow an operator to sequentially cycle through screens. The use of the pushbuttons allows sequential displays. For example, the entry number could be displayed on a first screen, the pocket number could be displayed on a second screen and the endpoint name could be displayed on a third screen. Each of the electronic labels 322A-322E is preferably provided with a second pushbutton 326A-326E, respectively, in order to allow the operator to send a signal to the transmitter server 108 by pressing the second pushbutton. It may be desirable, for example, for an operator to signal that movement of a tray such as the tray 320A has been accomplished by pressing the second pushbutton 326A, signaling that the tray 320A has been placed at the staging area.

After image capture has been performed and documents have been placed in a tray, the tray is placed in the staging area while balancing is performed. FIG. 4 illustrates additional details of the balancing station 206, and a staging area 404 in which documents are held while balancing is performed. The trays 320A-320E are illustrated as being held at the staging area 404 while balancing is performed for each item contained in the trays. The balancing station 206 includes a display 406, keyboard 408 and the balancing station controller 208. The balancing station controller 208 is connected to the subserver 214 and retrieves captured item information from the subserver 214. The balancing station controller 208 examines the captured item information for each item in the entry to determine if it is in balance. For a deposit, for example, the deposit is in balance if the total dollar amount of the documents making up the deposit matches the total reflected on the deposit slip. For each document, an attempt is made to perform character recognition on the previously captured document image in order to determine the dollar amount of the document. If it is not possible to determine the amount automatically, the display 406 is used to display the document image to a human operator who keys in the amount using the keyboard 408. Once the document amounts for an item have been determined, balancing is performed. If the item is in balance, the balancing station controller 208 recognizes that the item is balanced and retrieves information for the next item. If the item is not in balance, a human operator needs to review the documents comprising the item to determine the reason for the discrepancy In order to do this, the operator needs to be directed to the tray where the item is located. When an out of balance item is detected, the operator is advised of the entry number and pocket number containing the item, suitably through the display 406. The entry number and pocket number are already displayed on the electronic labels 322A-322E, allowing easy location of the appropriate tray. It is also possible for the balancing station controller 208 to direct the transmission of a flashing message to the electronic label, in order to assist in location of the correct tray.

Once the contents of a tray are in balance, the documents within the tray are ready to be moved from the staging area 404 to allow encoding to be performed. The balancing station controller 208 signals the subserver 214 that balancing is completed, and the subserver 214 directs the transmitter server 108 to prepare new display messages for the electronic labels. The transmitter server 108 then transmits the messages to the labels using the communication interface 112. The information displayed may suitably be a tray number, the total dollar amount contained in the tray and the number of items within the tray, and may suitably be flashing to draw operator attention. If desired, additional information may be displayed, for example priority information. If a tray contains a high dollar value combined with a relatively small number of items, indicating the presence of high-value items, it may be assigned a high priority for processing in order to make certain that the high value items are processed by the day's deadline time in order to minimize float time.

Returning now to FIG. 3B, the documents comprising an entry are returned to the item transport 202 and fed into the document hopper 302 in order to perform encoding. The documents move along the transport path 304 to the encoding module 314 for encoding, that is, for addition of the dollar amount of each document and other information using MICR encoding. After encoding is performed on each document, the document is carried to the endorsing module 316 for application of an endorsement. After encoding and endorsement are performed on a document, the document is sorted to an appropriate one of the sorting pockets 318A-318E. As each of the sorting pockets 318A-318E is filled, the documents in the pockets will be placed in appropriate document trays.

At the encoding and sorting stage, documents are sorted according to different criteria than previously at the item capture stage. Therefore, documents will be sorted into different pockets and placed in different trays than at the item capture stage. Therefore, when the contents of the trays 320A-320E, are returned to the item transport 202 for encoding and sorting, the transport controller 204 directs the subserver 214 to break the association between the trays 318A-318E and the original pocket numbers of the documents. The subserver 214 sends an instruction to the transmitter server 108 to clear the display message from the electronic labels 322A-322E, and also removes the association between the addresses of the electronic labels 322A-322E and the original pocket numbers assigned during item capture. New associations between the trays, corresponding electronic labels and pockets are made using the techniques previously described. The documents are encoded and sorted into the pockets 318A-318E. As each of the pockets 318A-318E fills, the contents of the pockets are placed into an appropriate tray. The trays 320A-320E may be reused, because the trays 320A-320E and all similar trays may suitably be designed so that the only distinguishing features of the trays are the electronic labels and the accompanying display messages and bar codes. It will be clear, however, that any similar trays may be used in place of the trays 320A-320E.

During encoding, the encoding module 314 places MICR amount information on all documents. After each document is encoded, the item transport 202 sorts the document into one of the pockets 318A-318E. Sorting of the documents depends on the final destination, or endpoint, of the documents. Endpoints may include a cash letter creation area, for documents to be sent to a different institution or a central clearinghouse, a rehandle sorter or a bulk file storage area, for items drawn on the processing institution. As each of the pockets 318A-318E fills, the contents of the pockets are placed in the trays 320A-320E, respectively. The electronic labels 322A-322E display the tray number and entry number previously assigned during item capture, and a newly assigned pocket number. After the encoding and sorting has been performed, the trays are taken to an encode and sort staging area.

The encode and sort operation typically produces exceptions, including documents that could not be matched for encoding, documents missing at the encoding stage and documents requiring special handling and research, such as documents having invalid account numbers. Exception items are typically sorted to an exception pocket and placed in an exception tray. For example, exception items may be sent to the pocket 318E and placed in the tray associated with the pocket 318E, for example the tray 320E. After exception items are identified, they must be reconciled.

FIG. 5 illustrates further details of the reconciliation station 210, used in reconciling exception items of an entry whose documents have been encoded and sorted, placed in trays and taken to an encode and sort staging area 504. The entry is shown here as being contained in the trays 320A-320E having affixed labels 322A-322E. The exception items are shown here as contained in the tray 320E having the affixed label 322E.

The reconciliation station 210 includes the reconciliation station controller 212, as well as a display 506 and keyboard 508. The reconciliation station controller 212 is connected to the subserver 214. An operator is able to retrieve information about an exception item for display in the display 506. As each document representing an exception is identified, the entry number and pocket number to which the document is to be placed is displayed using the display 506 and the operator is able to use the electronic label information to identify the tray in which the document belongs.

Once reconciliation of an entry is complete, the reconciliation station controller 212 alerts the subserver 214, which directs the transmitter server 108 to prepare messages for transmission to the electronic labels 322A-322E. Each of the electronic labels 322A-322E displays a message including the tray number, deadline time, endpoint name and dollar amount of the documents. The message information preferably flashes and transitions between the different information items. The flashing indicates that processing of the tray contents is complete, and the alternating between information items allows the operator to easily see all needed information. The trays 320A-320E are then dispatched to the proper endpoints based on the information displayed on the electronic labels 322A-322E. The information on the display labels 322A-322E can be used to prepare documents associated with the corresponding trays and tray contents. For example, if the tray 320A is dispatched to a cash letter creation area, the endpoint name and tray number needed to associate the contents of the tray 320A with a corresponding cash letter can be taken directly from the electronic label 322A where this information is displayed.

Exemplary operations performed by a document processing system are illustrated here, but a processing system according to the present invention can easily be adapted or designed to allow the performance of any of a wide variety of operations, with display information being sent to electronic labels to provide operator information in order to assist operators in locating a tray containing a desired document, to inform operators of details of the contents of a tray or to instruct operators that a tray needs attention and the nature of the attention needed. It will also be clear that the specific stations illustrated here are not essential to the use of the present invention. For example, a single item transport 202 is shown here as performing both item capture and encode and sort operations, while separate stations are used to perform balancing and reconciliation. It will be recognized, however that separate item capture and encode and sort stations are possible, while a combined balancing and reconciliation station is also possible. Other combinations of stations may also be employed.

Figure 6:
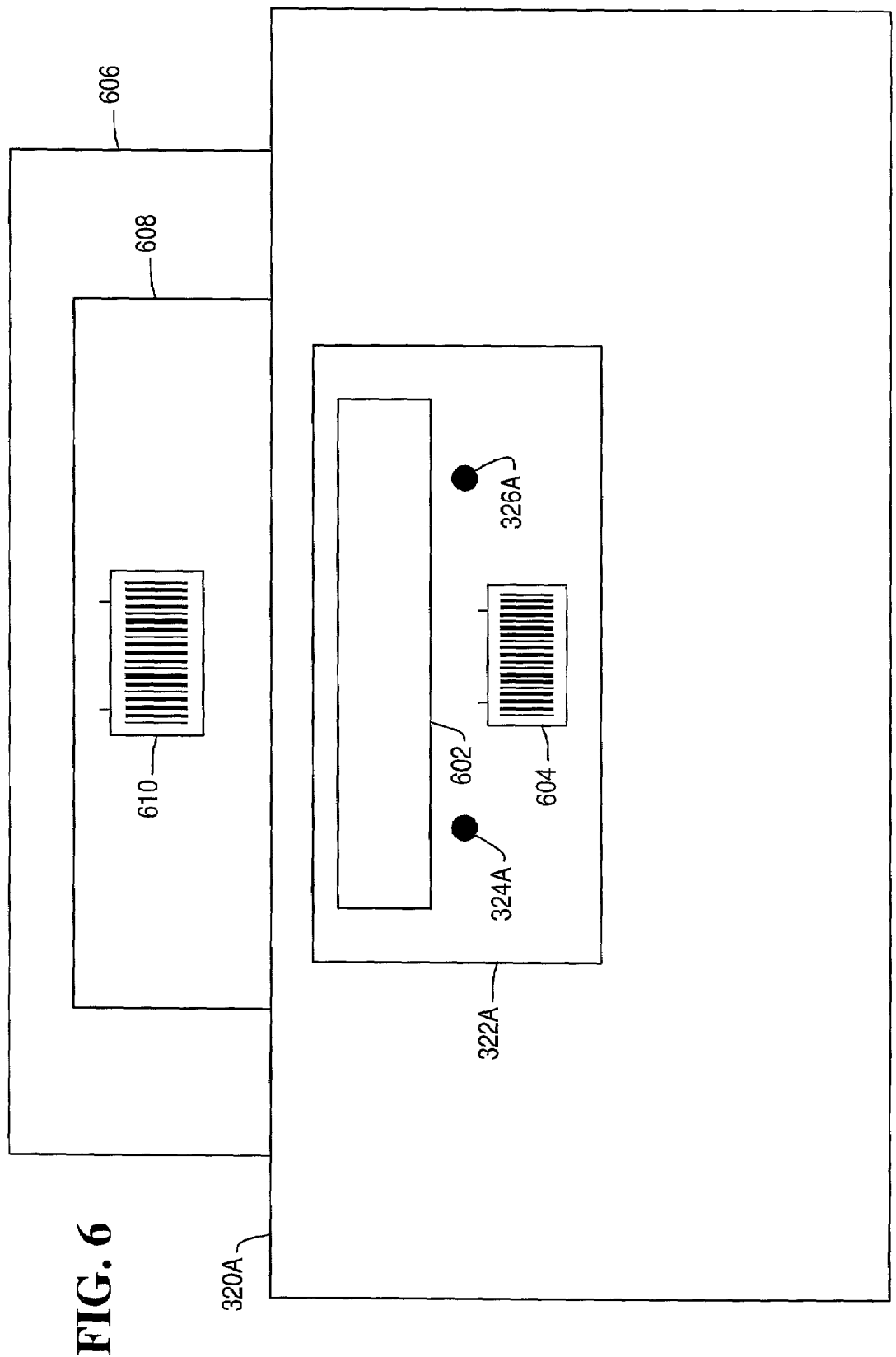
FIG. 6 illustrates a document tray employing an electronic label according to the present invention.

FIG. 6 illustrates additional details of the document tray 320A according to the present invention. The document tray has affixed to it the electronic label 322A, having a display 602 and the first and second pushbuttons 324A and 326A, respectively. The label 322A also includes an identifying label bar code 604, which may be scanned in order to identify the label 322A and thus the tray 320A. The tray 320A is shown here as including a batch of work 606, of which the first item is a header page 608 having an identifying header bar code 610. By scanning the header bar code 610 and the label bar code 604, an operator is able to associate a unit of work with the label 322A and thus the tray 320A.

Figure 7:
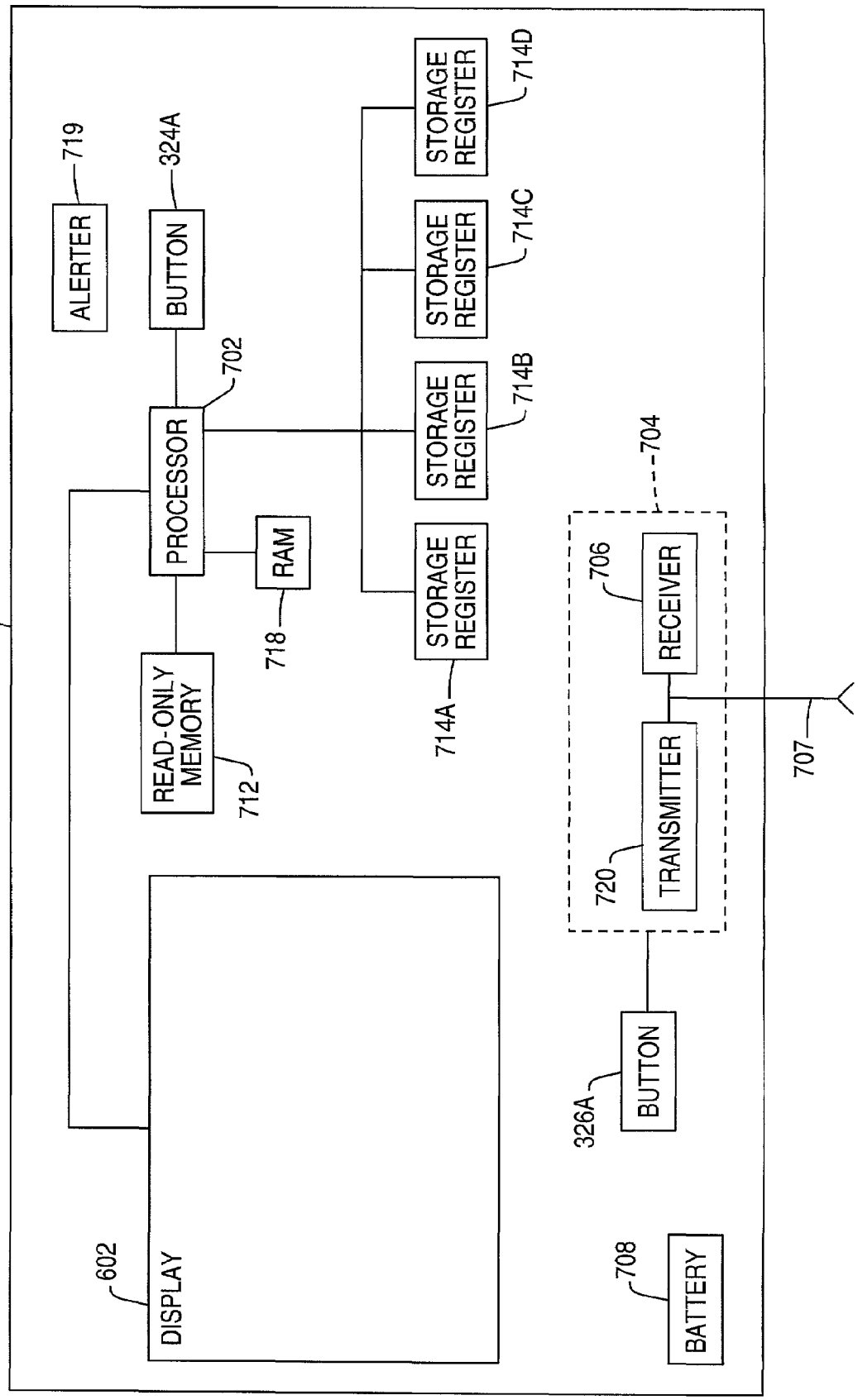
FIG. 7 illustrates additional details of an electronic label according to the present invention.

FIG. 7 illustrates additional details of the label 322A according to the present invention. The label 322A includes a label processor 702, which may suitably be implemented as a digital signal processor, and a label communications interface 704 for communicating with the communication interface 112. The label communications interface 704 includes a receiver 706 and an antenna 707. The antenna 707 is built into and preferably enclosed entirely within the label 322A. The label 322A includes various other electronic components, including a battery 708, and the display 602, which is preferably an LCD display. The label 322A further includes read-only memory 712 for permanent storage of instructions and other data, as well as data registers 714A-714D for storing message information received from the communication interface 324. The data registers 714A-714D are preferably implemented using volatile memory. The first pushbutton 324A allows an operator to cycle through display screens by directing the processor 702 to select the contents of any one of the registers 714A-714D for display. Repeated presses of the pushbutton 324A cycle between the different registers 714A-714D. In this way, the label 322A is able to receive messages longer than could otherwise be displayed on the LCD display 602, allowing the operator to read such messages by cycling through successive screens. The second pushbutton 326A allows the operator to send signals to the communication interface 112.

The label 322A also includes writable memory 718 in addition to the volatile memory used for the data registers 714A-714D. The writable memory 718 is used for short-term data storage in performing the normal operations of the label 322A.

When the label 322A receives a message from the communication interface 112, the processor 702 displays the message using the LCD display 602. The processor 702 may also control the sending of an audible signal by driving an alerter 719.

While active devices may be employed, the label 322A is preferably implemented as a passive device in order to reduce cost and complexity. In such an implementation, the label 322A does not independently transmit data to the communication interface 112, but sends signals only in response to status requests received from the communication interface 112. When a subserver such as the subserver 214 directs the sending of a display message to a label such as the label 322A, the subserver 214 preferably also directs the sending of repeated status requests by polling the label 322A, in order to determine if the operator has pressed the second button 326A to signal a change in status of the label 322A, such as movement of the associated tray 320A to the next destination. When the operator presses the second button 326A, the label 322A employs modulated backscatter to answer the status request, reflecting the transmission back to the communication interface 112. Upon receiving the reflected answer to the status request, the communication interface 112 conveys the answer to the transmitter server 108, which notifies the subserver 214 that an answer has been received. The subserver then responds by, for example, alerting a station operator that the tray 320A is in the proper location for beginning the next step of the processing operation.

It will be recognized that it is possible to implement the label 322A including a transmitter 720. If such an implementation is chosen, the label 322A can send unsolicited messages to the communication interface 112, providing greater flexibility in operation at the expense of added cost and complexity of the label 322A.

The label 322A is preferably implemented by adapting an electronic shelf label, presently used in retail environments to receive radio frequency information messages comprising product description and price information and to respond to queries through the use of modulated backscatter. An electronic shelf label can be purchased from a suitable vendor and adapted for use as a label such as the label 322A simply by selecting the messages to be transmitted to the unit. Alternatively, a modified design may be developed to more closely adapt the display unit to the requirements of the document processing environment. For example, the data registers 714A-714D are preferably implemented as flash memory when the device is used as an electronic shelf label, because the contents of the registers change relatively infrequently. In a document processing environment, the contents of the registers 714A-714D change with much greater frequency, so that an institution might find it desirable to specify a design for a label such as the label 322A using RAM to implement the data registers 714A-714D.

Figure 8:
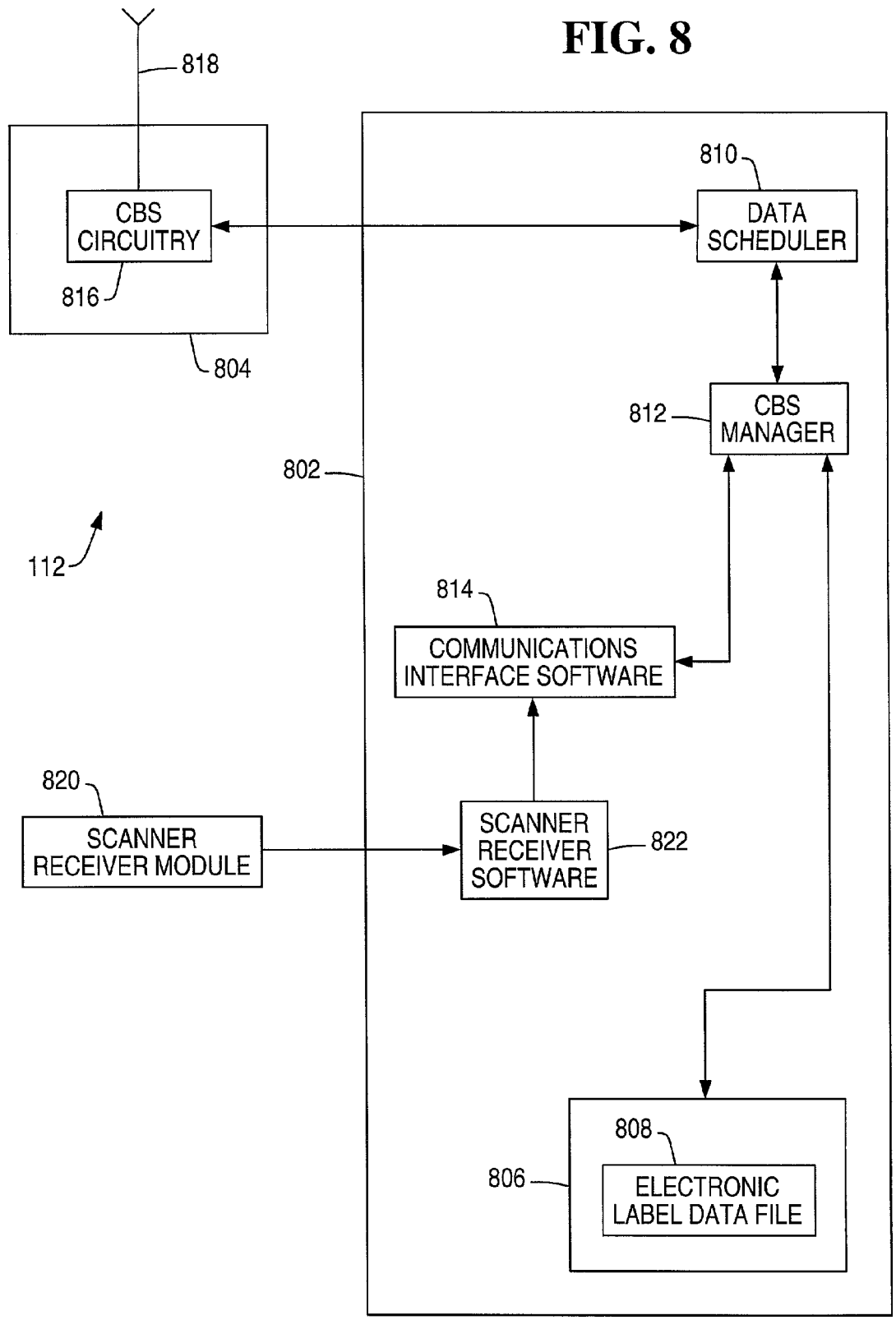
FIG. 8 illustrates a communication interface according to the present invention.

FIG. 8 illustrates additional details of the communication interface 112 of FIG. 1. The communication interface 112 is suitably adapted from an electronic shelf label communication device and includes a computer 802 and communication base station (CBS) 804. The computer 802 includes a storage medium 806, which may suitably be a disk drive, on which is stored an electronic label data file 808 containing addresses of all electronic labels such as the labels 322A-322E, as well as data to be transmitted to each label. The computer 802 implements electronic label control software including a data scheduler 810 which manages transmission and reception of messages to and from each of the labels, as well as CBS management software 812, which directs the operations of the CBS 804 and which constructs messages to and interprets messages from the labels. The computer 802 also implements communication interface software 814, which manages the receipt of instructions from other elements of the document processing system and passes messages received from the labels to appropriate elements of the document processing system.

When the communication interface 112 receives an instruction to transmit messages to one or more labels, the computer 802 stores the messages in the electronic label data file 808, each message being indexed to the correct label address. The data scheduler software 810 retrieves the messages and addresses from the data file 808 when a message is scheduled to be sent, formats the messages and passes them to the CBS manager software 810. The CBS manager software 810 formats the messages for transmission by the CBS 804 and passes them to the CBS 804.

The CBS 804 translates the messages to a signal using CBS circuitry 816, and sends the signal using a CBS transmit antenna 818. The CBS transmit antenna 818 and CBS circuitry 816 are also adapted to receive signals from the electronic labels in the form of modulated backscatter. When a signal is received from an electronic label, the signal is converted to a message by the CBS circuitry 816, which passes the message to the data scheduler 810. The data scheduler 810 in turn passes the message to the CBS manager 812. The CBS manager software 810 passes the message to the communication interface software 814, which in turn passes the message to the transmitter server 108. The computer 802 includes software adapted from management of electronic shelf labels and the CBS 804 is an adaptation of a CBS used to communicate with electronic shelf labels. In this way, the communication interface 112 can be constructed through the purchase and adaptation of readily available devices. Electronic shelf labels are used in the typical retail store environment in great numbers over a wide area, so that a number of CBS modules such as the CBS module 804 are employed to communicate with and control them. In a document processing environment, the number of electronic labels and the range over which they are to be used is likely to be smaller than in the retail store environment, so that it will often be possible to employ only one CBS module such as the module 804. However, if desired, it is easy to employ multiple CBS modules such as the CBS module 804 to manage large numbers of electronic labels and to use the CBS manager software 810 to control the multiple CBS modules.

The communication interface 112 is also able to receive wireless scanner transmissions. The communication interface 800 thus includes a scanner receiver module 820 which furnishes bar code information to scanner receiver software 822 implemented in the computer 800.

Figure 9:
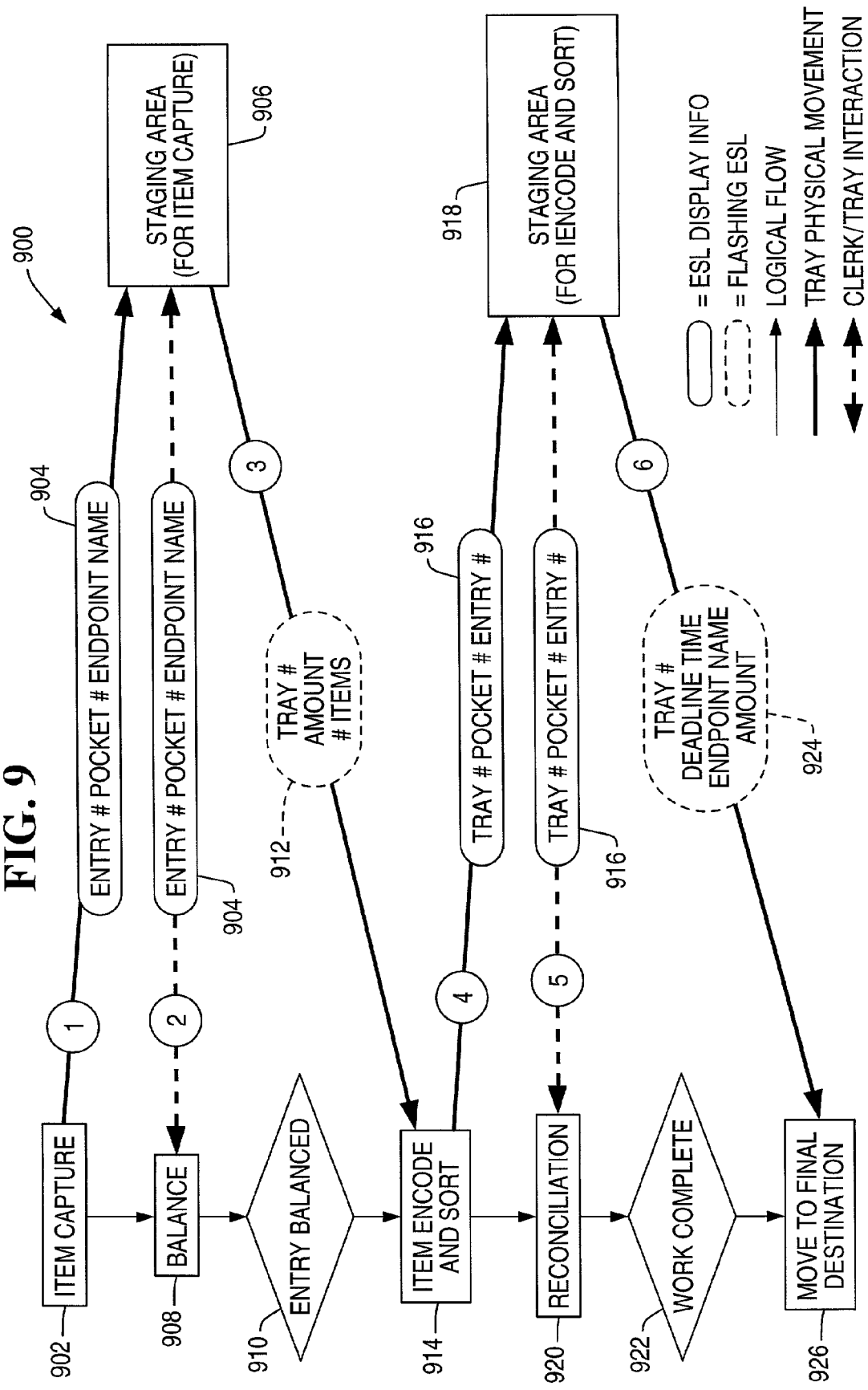
FIG. 9 illustrates stages of a document processing operation employing an electronic label according to the present invention.

FIG. 9 is an illustration of processing stages, movements displays and operator interaction undergone by a processing tray in a processing operation 900 according to the present invention. An exemplary instance of deposit processing is illustrated here, but it will be recognized that the techniques of the present invention can be adapted to any desired processing operation. The processing tray is one of a number of similar trays used to hold documents making up an entry, as discussed above in connection with FIG. 1. The processing operation includes a first stage of item capture 902. After the item capture stage 902 is complete, documents are placed in the processing tray and a first display 904 is displayed by an electronic label affixed to a document tray. The first display 904 includes entry number, pocket number and endpoint name information. The tray is moved to an item capture staging area 906 while a balancing stage 908 is performed. During the balancing stage 908, the first display 904 continues to be displayed by the electronic label, allowing easy location of the tray when examination of a document within the tray is required.

Once a determination 910 is made that the entry is balanced, that is, that all items in the entry are in balance, a second display 912 is displayed by the label, indicating the tray number, the dollar amount and the number of items The second display 912 preferably flashes to draw operator attention. The tray is moved to an item encode and sort stage 914. Once the item encode and sort stage 914 is complete, sorted documents are placed in the tray and a new display 916 appears, showing the tray number, pocket number and entry number. The tray is moved to an encode and sort staging area 918. Next, a reconciliation stage 920 is performed. The label continues to show the display 916 to allow identification of the correct tray in which to place documents for which exceptions have been resolved. Once a determination 922 has been made that reconciliation is complete and therefore that the work is complete, a final display 924 is shown by the label containing the tray number, deadline time, endpoint name and dollar amount. A movement 926 to a final destination is then performed.

Figure 10:
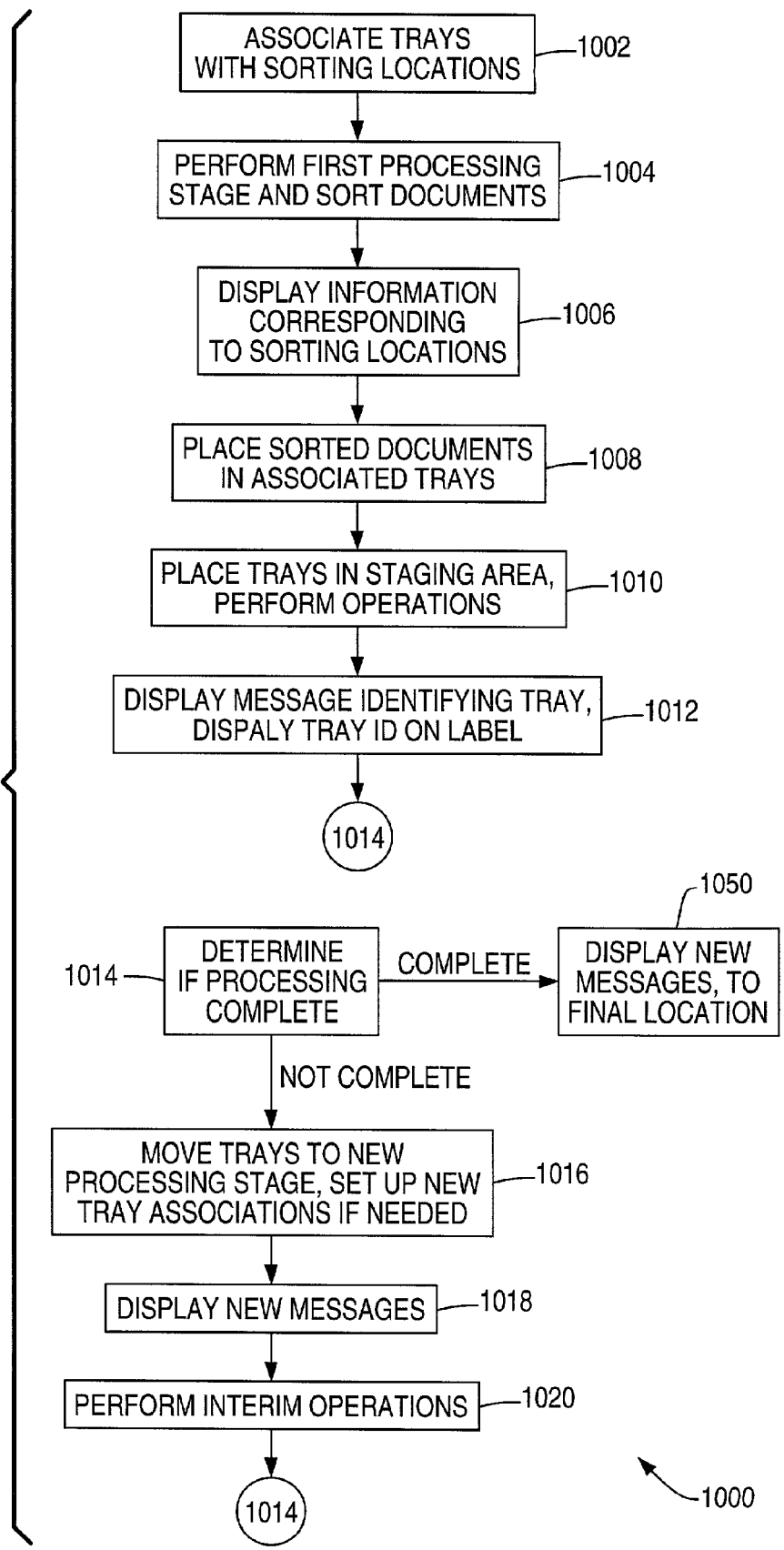
FIG. 10 illustrates a process of document processing according to the present invention.

FIG. 10 illustrates a process 1000 of document processing according to the present invention. At step 1002, each of a plurality of document trays, each tray having an affixed electronic label, is associated with a sorting location for a collection of documents to be placed in the tray. The collection of documents to be placed in the tray may suitably be a subset of a larger set of documents processed together, such as documents which are members of an entry, and the sorting location may suitably be a sorting pocket into which documents are to be sorted. At step 1004, documents are subjected to a first processing stage and sorted into sorting locations. At step 1006, a display appropriate to each sorting location, the documents contained within each sorting location and the processing stage is generated and wirelessly transmitted to the electronic label affixed to the tray corresponding to the sorting location, and displayed by the electronic label. At step 1008, documents at each sorting location are associated with a tray which is itself associated with the sorting location and placed in the tray. For each tray, the information displayed may suitably include information indicating whether the documents within the tray have special processing priority. This information may suitably be related to criteria such as deadlines relating to documents within the trays, total dollar value of items within the trays, or other desired criteria. At step 1010, the trays are placed in a staging area while interim operations relating to the documents within the trays are performed. At step 1012, when a document within a tray needs to be reviewed by an operator, a display console displays a message identifying a tray where the item can be found, with the location information preferably matching information displayed on the electronic label on the tray in which the document is located. At step 1014, upon completion of interim processing operations, a determination is made as to whether processing is complete. If document processing is complete, the process proceeds to step 1050, the displays are changed to display messages appropriate to final disposition of the trays, and the trays are moved to a final location. If document processing is not complete, the process proceeds to step 1016 and the trays are moved to a new processing stage and the documents are removed from the trays and subjected to further processing steps. At this point, the documents may be sorted according to different criteria than at step 1004, with the result being that the documents are sorted into a different order than at step 1004. If this happens, it may be desirable to establish new associations between trays and sorting locations. In this case, or if for any other reason it is desirable to change the associations between trays and sorting locations, the original associations are broken and new associations are established according to desired criteria. At step 1018, new displays appropriate to the new processing stage are transmitted to the electronic labels. At step 1020, the trays are moved to another staging area while interim operations related to the documents are performed. When the interim processing operations are completed, the process returns to step 1014.

While the present invention is disclosed in the context of a presently preferred embodiment, it will be recognized that a wide variety of implementations may be employed by persons of ordinary skill in the art consistent with the above discussion and the claims which follow below.

What is claimed is:

1. A check processing apparatus comprising:
an image capture transport including (i) an image capture device for capturing images of physical checks in which each check has an assigned entry number associated therewith, (ii) a number of pockets into which physical checks can be sorted and in which each pocket has an assigned pocket number associated therewith, and (ii) a transport controller for providing information relating to physical checks which have been processed at the image capture transport;

an encoding transport including a magnetic ink character recognition (MICR) encoder for encoding MICR codelines onto physical checks;

a physical receptacle for (i) containing physical checks which have been processed at the image capture transport, and (ii) allowing the physical receptacle along with physical checks contained therein to be physically transported from the image capture transport to the encoding transport;

an electronic label affixed to the physical receptacle and including (i) a physical display for displaying a visual message, (ii) a first communication interface for receiving electronic messages which have been wirelessly transmitted from another communication interface, and (iii) a processor for causing the physical display to display a visual message having both an entry number and a pocket number associated with the physical checks contained in the physical receptacle;

a subserver for receiving information which associates the physical receptacle and the electronic label affixed thereto to a corresponding pocket of the image capture transport;

a transmitter server for generating display messages based upon information from the subserver; and a second communication interface for wirelessly transmitting the generated display messages from the transmitter server to the first communication interface of the electronic label so that visual information including both the entry number and the pocket number associated with the physical checks contained in the physical receptacle can be displayed on the physical display of the electronic label.

2. A check processing apparatus according to claim 1, wherein the electronic label includes a first manually-operable button electrically coupled to the processor and for, when manually operated, directing the processor to cause the physical display to display visual information including the entry number and the pocket number in sequential screens.

3. A check processing apparatus according to claim 2, wherein the electronic label includes a second manually-operable button electrically coupled to the processor and for, when manually operated, allowing an operator to send a signal to the second communication interface.

4. A check processing apparatus according to claim 1, wherein the electronic label further includes an alerter electronically coupled to the processor and for, when driven by the processor, providing an audible alert signal.

5. A check processing apparatus comprising:

an image capture transport including (i) an image capture device for capturing images of physical checks in which each check has an assigned entry number associated therewith, (ii) a number of pockets into which physical check can be sorted and in which each pocket has an assigned pocket number associated therewith, and (iii) a transport controller for providing information relating to physical checks which have been processed at the image capture transport;

a balancing station including (i) a display for displaying check images, (ii) an input device for enabling an operator to enter check amounts, and (iii) a balancing station controller for examining information associated with check images to determine if a balanced condition exists and for providing a balance complete signal when a determination is made that a balanced condition exists;

a reconciliation station including (i) a display for displaying check images, and (ii) a reconciliation station controller for reconciling physical checks which have been identified as being exception items and for providing a reconciliation complete signal when reconciliation is completed;

an encoding transport including a magnetic ink character recognition (MICR) encoder for encoding MICR codelines onto physical checks;

a physical receptacle for (i) containing physical checks which have been processed at the image capture transport, and (ii) allowing the physical receptacle along with physical checks contained therein to be physically transported from the image capture transport to the encoding transport;

an electronic label affixed to the physical receptacle and including (i) a physical display for displaying a visual message, (ii) a first communication interface for receiving electronic messages which have been wirelessly transmitted from another communication interface, and (iii) a processor for causing the physical display to display a visual message having both an entry number and a pocket number associated with the physical checks contained in the physical receptacle;

a subserver for (i) receiving information which associates the physical receptacle and the electronic label affixed thereto to a corresponding pocket of the image capture transport, (ii) receiving the balance complete signal from the balancing station, and (iii) receiving the reconciliation complete signal from the reconciliation station controller;

a transmitter server for generating display messages based upon information from the subserver; and a second communication interface for wirelessly transmitting the generated display messages from the transmitter server to the first communication interface of electronic label so that visual information including both the entry number and the pocket number associated with the physical checks contained in the physical receptacle can be displayed on the physical display of the electronic label.

6. A check processing apparatus according to claim 5, wherein the electronic label includes a first manually-operable button electrically coupled to the processor and for, when manually operated, directing the processor to cause the physical display to display visual information including the entry number and the pocket number in sequential screens.

7. A check processing apparatus according to claim 6, wherein the electronic label includes a second manually-operable button electrically coupled to the processor and for, when manually operated, allowing an operator to send a signal to the second communication interface.

8. A check processing apparatus according to claim 5, wherein the electronic label further includes an alerter electronically coupled to the processor and for, when being driven by the processor, providing an audible alert signal.

9. A check processing apparatus for enabling an operator to physically transport checks from an image capture transport which captures images of checks and sorts the checks into a plurality of pockets to an encoding transport which encodes magnetic ink character recognition (MICR) codelines onto checks, each check having an assigned entry number associated therewith and each pocket having an assigned pocket number associated therewith, the check processing apparatus comprising:

a plurality of check document trays for (i) containing checks which have been sorted into the plurality of pockets at the image capture transport, (ii) allowing checks to be moved from each of the plurality of pockets into a corresponding one of the plurality of check document trays, and (iii) allowing the plurality of check document trays along with checks contained therein to be physically transported from the image capture transport to the encoding transport for encoding MICR codelines onto the checks; and a plurality of electronic labels associated with the plurality of check document trays such that each of the plurality of electronic labels is affixed to a corresponding one of the plurality of check document trays, each of the plurality of electronic labels including (i) a physical display for displaying a visual message, (ii) a communication interface for receiving electronic messages which have been wirelessly transmitted from a communication interface associated with the image capture transport, and (iii) a processor for causing the physical display to display a visual message which is based upon at least one electronic message which has been received from the communication interface associated with the image capture transport to provide visual information including both the entry number and the pocket number associated with the checks contained in a check document tray which has been physically transported from the image capture transport to the encoding transport.

10. A check processing apparatus according to claim 9, wherein the electronic label includes a first manually-operable button electrically coupled to the processor and for, when manually operated, directing the processor to cause the physical display to display visual information including the entry number and the pocket number in sequential screens.

11. A check processing apparatus according to claim 10, wherein the electronic label includes a second manually-operable button electrically coupled to the processor and for, when manually operated, allowing an operator to send a signal to the communication interface associated with the image capture transport.

12. A check processing apparatus according to claim 9, wherein the electronic label further includes an alerter electronically coupled to the processor and for, when being driven by the processor, providing an audible alert signal.

\* \* \* \* \*